United States Patent [19]

Kobayashi

[11] Patent Number: 4,712,104

[45] Date of Patent: Dec. 8, 1987

[54] REMOTE CONTROL BLIND SYSTEM

[75] Inventor: Masahiko Kobayashi, Nagaoka, Japan

[73] Assignee: Kuron Kabushiki Kaisha, Niigata, Japan

[21] Appl. No.: 724,998

[22] Filed: Apr. 19, 1985

[51] Int. Cl.[4] ........................ H04Q 7/00; G08C 19/00; E05F 11/00

[52] U.S. Cl. ........................... 340/825.52; 340/825.69; 340/825.72; 160/DIG. 17; 160/310; 49/357

[58] Field of Search ........................ 160/1, 7, 310, 311, 160/DIG. 17; 49/25, 357; 340/825.52, 825.69, 825.72; 318/16, 445, 484

[56] References Cited

U.S. PATENT DOCUMENTS

| | | | |
|---|---|---|---|
| 3,074,127 | 1/1963 | Ellis | 160/DIG. 17 |
| 3,294,152 | 12/1966 | Kuijvenhoven | 160/310 |
| 3,337,992 | 8/1967 | Tolson | 49/357 |
| 3,906,348 | 9/1975 | Willmott | 340/825.69 |
| 4,492,908 | 1/1985 | Stöckle et al. | 160/DIG. 17 |
| 4,550,759 | 11/1985 | Archer | 160/DIG. 17 |

FOREIGN PATENT DOCUMENTS

| | | | |
|---|---|---|---|
| 3304962 | 8/1984 | Fed. Rep. of Germany | 160/310 |

*Primary Examiner*—Ulysses Weldon
*Assistant Examiner*—Ralph E. Smith
*Attorney, Agent, or Firm*—Koda and Androlia

[57] ABSTRACT

A remote control system for window blinds including a control unit provided for each of a plurality of blinds which are opened and closed freely, each blind further including rotatable slats. The control unit is provided with a signal receiver, and through the use of a transmitter, which is provided separately, the control unit controls the individual blind as well as slats thereof, and a plurality of control units can be successively actuated so that two or more blinds and the slats thereof can be controlled at the same time from a distance. By means of this remote control system, a centralized control of the blinds can be performed without requiring a special control board, and erroneous operation can be avoided as blind operation is done after the blind number is designated. When the blind operation is completed, the system is automatically reset for the next operation command.

8 Claims, 2 Drawing Figures

REMOTE CONTROL BLIND SYSTEM

BACKGROUND OF THE INVENTION

The present invention relates to a blind system, and more particularly to a remote control blind system for controlling rotation of the slats and opening and closing window blinds from a distance.

SUMMARY OF THE INVENTION

The object of the present invention is to provide a centralized remote control system for a plurality of window blinds which can be operated from a distance, controlling the window blinds and slats thereof individually and independently of each other through the use of a single transmitter.

Another object of the present invention is to provide a remote control system for operating blinds that reduces the size of the blind controlling unit and is capable of centralizing control without requiring a specific control board.

A further object of the present invention is to provide a remote control system for blinds that is capable of optionally operating a plural number of blinds successively.

A still further object of the present invention is to provide a remote control system for blinds that is improved by reducing errors during controlling operation of the blinds.

The objects of the present invention are accomplished by a unique structure of a remote control blind system including control units provided in each of a plurality of blinds, each of the blind groups further including rotatable slats. A signal receiver for the foregoing control unit receives signals from a transmitter so that the control unit controls the opening and closing of the individual blind and turning of its slats and so that two or more control units successively control a plurality of blinds and slats.

DETAILED DESCRIPTION OF THE INVENTION

A detailed description will hereunder be given of the embodiment of the present invention with reference to the drawings attached hereto.

Figure 1:
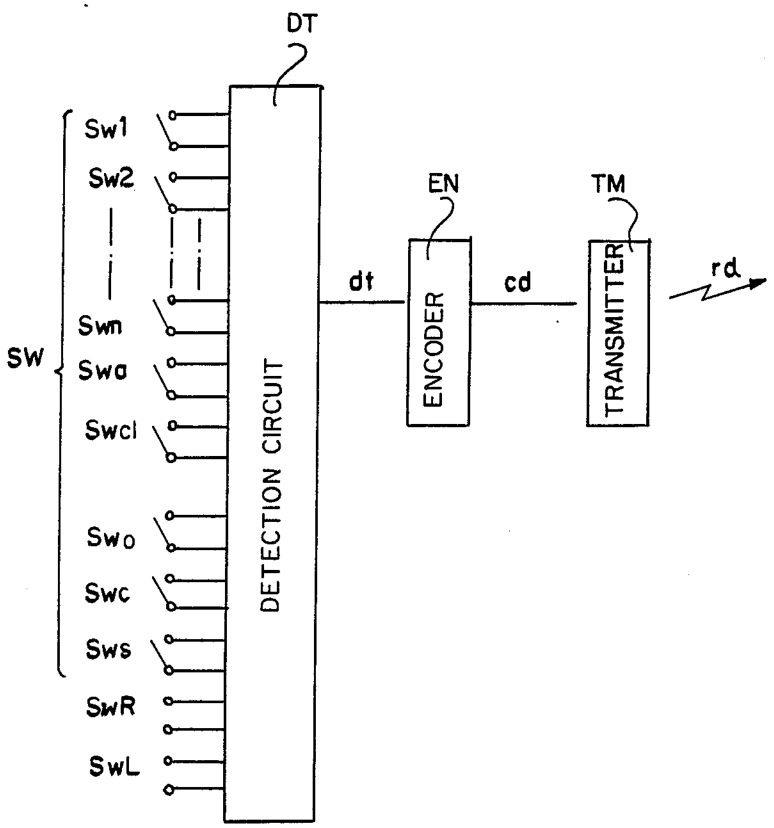
FIG. 1 is a block diagram showing the switch and transmitter component used in the blind system of the present invention.

First, FIG. 1 is a schematic block diagram of a transmitter as a component unit of the embodiment. In the FIG., Sw1--Swn are the switches for addressing the blind numbers. These switches are used to selectively designate the individual blinds which are n in number. The blind number designating switch is turned on when operating a blind desired to be operated. Thus, the switches and blinds are linked by the numbers corresponding to each other.

Swa is also a switch, and the switch Swa is turned to the on position when all of the blinds, which are n in number, are to be operated at the same time.

Switch Swcl is turned on to release all of the blinds, which are n in number, from the state they are in, regardless of whether they are in an operation state or in a non-operation state so that they can be prepared for the next operation.

Switch Swo is turned on when opening the blinds, and switch Swc is turned on when closing the blinds. Switch Sws is turned on when the opening or closing operation of the blinds is to be stopped in the middle of the action.

Switch SwR is turned on when the slats of a blind are rotated to the right, while a switch SwL is turned on when it is desired to rotate the slats of the blind to the left.

In FIG. 1, DT is a detection circuit for switch input, and it functions to detect which of the switches in the switch group SW is (are) turned on. This detection circuit DT also serves to output a single-shot signal of switch detection dt. With regard to the switches SwR and SwL for slats rotations, the detection circuit DT outputs the switch detection signal dt continuously when the switch SwR or SwL is kept in the on position.

EN is an encoder for converting the input switch detection signal dt and outputting a serial code signal cd which is preset so that the signal cd corresponds to the detection signal dt.

TM is a transmitter. The transmitter TM receives and modulates the encoded signal cd and outputs the radio signal rd in the form of radio waves, infrared rays, sound waves, etc.

Figure 2:
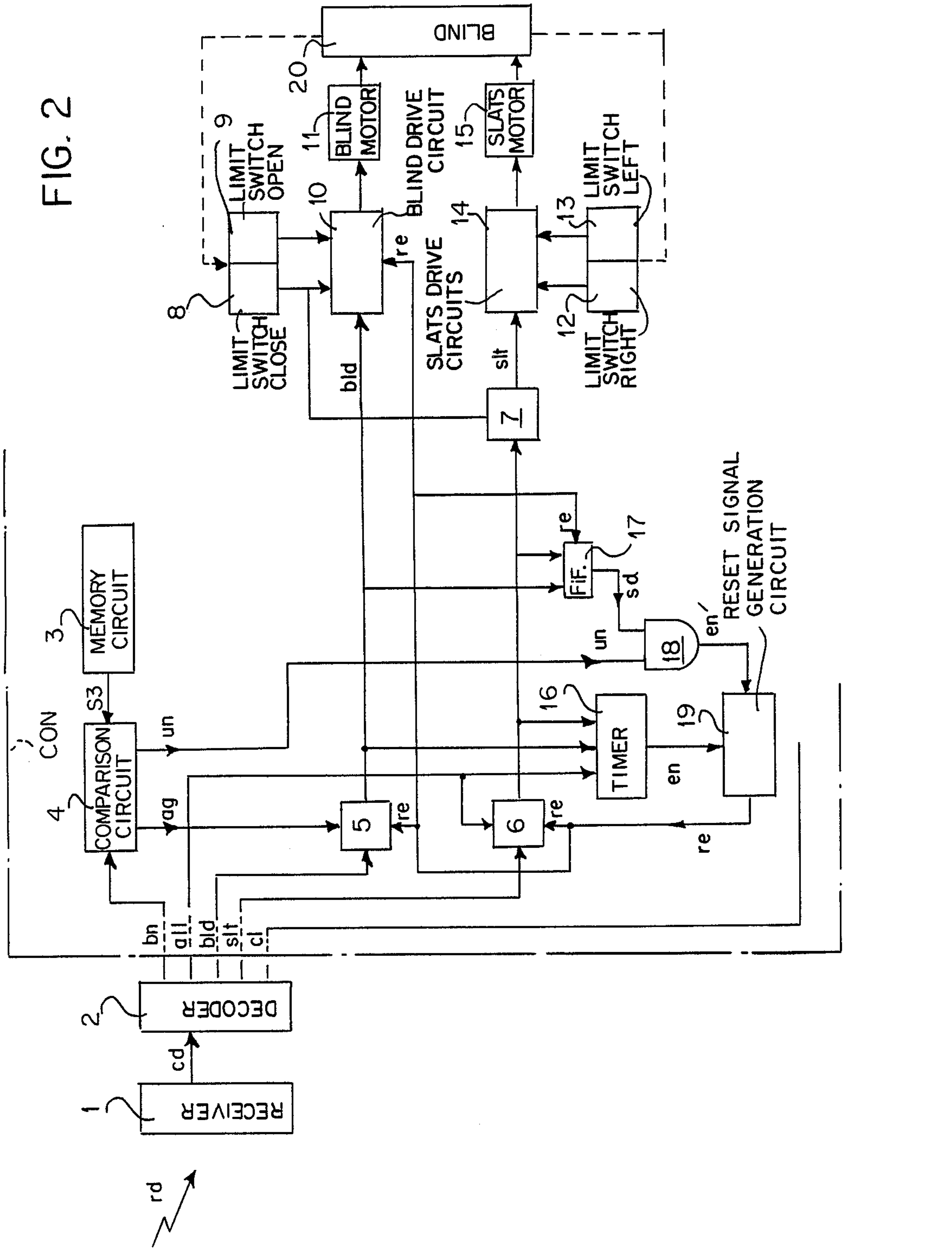
FIG. 2 is a block diagram of the receiver component thereof.

FIG. 2 is a schematic block diagram of a receiver as a component unit of the embodiment of this invention. In the Figure, the numeral 1 is a receiver, and it receives and demodulates the radio signals rd from the transmitter TM and outputs the encoded signals cd. A decoder 2 receives the encoded signals cd and decodes them into various types of signals.

The numeral 3 is a memory circuit for the blind number. In this blind number memory circuit 3 is stored the blind number which is previously determined for each blind.

The numeral 4 is a comparison circuit for comparing the numbers of the blinds. This blind number comparison circuit 4 serves to compare the blind number setting signal S3 from the memory circuit 3 with the blind number designating signal bn from the decoder 2 by receiving the foregoing signals respectively. Then, when those signals match each other, an agreement signal ag is output from the blind number comparison circuit 4, while otherwise the comparison circuit 4 outputs a unconformity signal un.

The numeral 5 is a holding type open/close gate. When the agreement signal ag and the full number designation signal all from the decoder 2 are input to this open/close gate 5, it is set in a gate-open state and maintained in this state.

The numeral 10 is a drive circuit for opening and closing the blind. Through the open/close gate 5, this drive circuit 10 receives and holds the blind operation signals bld which are sent from the decoder 2. The blind operation signals bld include the blind open signal, the blind close signal, and the blind operation stop signal. The drive circuit 10 also causes the blind motor 11 to rotate forward, backwards or to stop rotation. A blind 20 is opened or closed by the forward rotation or the reverse rotation of the motor 11.

A limit switch 8 detects the closing of the blind. When blind 20 is closed completely, the blind closing state detection limit switch 8 works to release the drive circuit 10 from the signal holding state, thereby stopping rotation of the motor 11. The numeral 9 is a limit switch for detecting the opening of the blind. This blind opening state detection limit switch 9 functions to release the drive circuit 10 from the signal holding state and causes the motor 11 to stop when the blind 20 is completely opened.

A holding type open/close gate 6 is set into the gate-open state and maintained in that state when the agreement signal ag and full number of blind designating signal all are input to the open/close gate 6.

An open/close gate 7 is kept in the gate-open state when the signal from the limit switch 8 for detecting the closing state of the blind is received by it.

The numeral 14 is a drive circuit for rotating the slats. Through the open/close gates 6 and 7, respectively, the slats drive circuit 14 receives slat operation signals slt including a right-rotation signal and a left-rotation signal so that as long as the slat operation signals slt sent from the decoder 2 are kept input, the slats drive circuit 14 rotates a slats motor 15 which rotates the slats forward or backward.

A plurality of slats (not shown in the Figure) as component parts of the blind 20 are, for example, rotated to the right or left by forward rotation or reverse rotation of the slats motor 15. A limit switch 12 detects the right-position of the slats. When the slats are fully rotated to the right, the slat right-position detection limit switch 12 causes the motor 15 to stop by way of the drive circuit 14. The numeral 13 is a limit switch that detects the left-position of the slats, and it causes the motor 15 to stop through the drive circuit 14 when the slats are fully rotated to the left.

The numeral 16 is a timer which repeats triggering. For example, when triggering is not repeated from about 50 to 60 seconds, the completion signal for the blind operation en is output. The input signals for the timer 16 are the agreement signal ag, the full number of blind designating signal all, the blind operation signal bld and the slat operation signal slt.

The numeral 17 is a flip-flop. It is set by the input of the operation signals bld and slt, and outputs the detection signal sd for the operation signal.

An AND gate 18 receives the detection signal sd and the unconformity signal un and outputs the blind operation end signal en′.

The numeral 19 is a reset signal generation circuit. When the clear signal cl from the decode 2, the completion signal en and the end signal en′ are inputed, respectively, this reset signal generation circuit 19 outputs the reset signal re.

The reset signal re causes the open/close gates 5 and 6 to be reset into the gate/close state. Also, at the same time, the reset signal generation circuit 19 causes the drive circuit 10 and the flip-flop 17 to be reset.

A control unit CON including the above elements of FIG. 2 is connected to the decoder 2 and is provided for each of the blinds which are n in number.

In operation, when one of the switch numbers Sw1–Swn corresponding to the number of the blind 20 that is to be operated is turned on, the agreement signal ag is output from the comparison circuit 4 causing both of the open/close gates 5 and 6 to open. Then, when the switch Swc for closing the blind 20 is turned on, by way of the open/close gate 5 which is in the open state, the blind operation signal bld is held at the drive circuit 10, and by means of the motor 11 the blind 20 is closed.

When the blind 20 is fully closed, the motor 11 stops, and due to the on-state of the switch 8, the open/close gate 7 opens. Then, when the slat operation switches SwR and SwL are in an on-state, the slat operation signal slt is input to the slats drive circuit 14 through the open/close gates 6 and 7, which are opened, and by means of the motor 15, the slats (not shown in the Figures) of the blind 20 are rotated.

About sixty seconds, for instance, after the slat operation signal slt, which indicates the final operation of the blind 20, is input to the timer 16, the reset signal re output from the reset signal generation circuit 19 resets the control unit CON so that it is reset and ready for the next command signal.

Since the embodiment uses holding type open/close gates 5 and 6, a plurality of blinds can be operated simultaneously by successively turning on the switches Sw1–Swn corresponding to the blinds to be operated.

Furthermore, when it is desired to operate another blind while one blind is in operation, any of the switches Sw1–Swn corresponding to the number of the blind desired to be operated is turned on. Upon this turn-on operation, the unconformity signal un is output from the comparison circuit 4, and as the detection signal sd is output from the flip-flop 17 which is set by the blind operation signals bld and slt. Thus, the control unit CON is reset through the AND gate 18 and the generation circuit 19 to prepare it for the next command signal.

As has been described above, the remote control blind system according to the present invention has a control unit CON which is provided for each of a plurality of blinds. Therefore, a centralized control of the blinds can be achieved without requiring a specific control board. Also, it is possible to optionally operate either one selected blind or two or more. In addition, the system has the advantage of eliminating the possibility of errors in operation since the blinds are operated after the blind number has been selected. Furthermore, after blind operation is completed, the blind can be reset automatically to be ready for the next command.

The invention claimed is:

1. A remote control blind system comprising:

a plurality of blinds which can be freely opened and closed;

a plurality of control units provided for each of said blinds, for independently opening and closing each of said blinds;

receiving means for receiving and processing radio signals and for transmitting said signals to said control units; and transmitting means provided separately from said receiving means, for transmitting said radio signals;

each of said control units at least comprising:

- means for storing a blind number to specify said blind;
- means for comparing a signal of said stored blind number with a designation signal of the blind number that was received and processed, from said radio signal and for transmitting an agreement signal of the blind number when said signals agree;
- a holding type open/close gate which is set by said agreement signal and which transmits an operation signal of the blind to a drive means for opening and closing the blind;
- a retriggerable timer which is triggered by the blind operation signal and which transmits a stop signal of the blind operation when said timer is not retriggered for a predetermined period of time; and reset signal generating means which resets the holding type open/close gate when the stop signal of the blind operation is transmitted.

2. A remote control blind system according to claim 1, wherein each of said control units has a mean for stopping blind operation which is set by the operation signal of said blind, which transmits a signal to stop the blind operation to said reset signal generating means when there is no said agreement signal, and which is reset by said reset signal generating means.

3. A remote control blind system according to claim 19 or 2 , wherein said drive means for opening and closing said blind is reset by said reset signal generating means.

4. A remote control blind system comprising:

a plurality of blinds having rotatable slats;

a plurality of control units provided for each of said blinds, for independently rotating said slats of each of said blinds;

receiving means for receiving and processing radio signals and for transmitting said signals to said control units; and transmitting means provided separately from said receiving means, for transmitting said radio signals;

each of said control units at least comprising;

means for storing a blind number to specify said blind;

means for comparing a signal of said stored blind number with a designation signal of the blind number that was received and processed, from said radio signal and for transmitting an agreement signal of the blind number when said signals agree;

a holding type open/close gate which is set by said agreement signal and which transmits an operation signal of the slats to a drive means for rotating the slats;

a retriggerable timer which is triggered by the slats operation signal and which transmits a stop signal of the blind operation when said timer is not retriggered for a predetermined period of time; and reset signal generating means which resets the holding type open/close gate when the stop signal of the blind operation is transmitted.

5. A remote control blind system according to claim 4, wherein each of said control units has a means for stopping the blind operation which is set by the operation signal of said slats, which transmits a signal to stop the blind operation to said reset signal generating means when there is no said agreement signal, and which is reset by said reset signal generating means.

6. A remote control blind system comprising:

a plurality of blinds which have rotatable slats and which can be freely opened and closed;

a plurality of control units provided for each of said blinds, for independently opening and closing each of said blinds and for independently rotating said slats of each of said blinds;

receiving means for receiving and processing radio signals and for transmitting said signals to said control units; and transmitting means provided separately from said receiving means, for transmitting said radio signals;

each of said control units at least comprising:

means for storing a blind number to specify said blind;

means for comparing a signal of said stored blind number with a designation signal of the blind number that was received and processed, from said radio signal and for transmitting an agreement signal of the blind number when said signals agree;

a holding type open/close gate which is set by said agreement signal and which transmits an operation signal of the blind to a drive means for opening and closing the blind;

a holding type open/close gate which is set by said agreement signal and which transmits an operation signal of the slats to a drive means for rotating the slats;

a retriggerable timer which is triggered by the blind or slats operation signal and which transmits a stop signal of the blind operation when said timer is not retriggered for a predetermined period of time; and reset signal generating means which resets the holding type open/close gate when the stop signal of the blind operation is transmitted.

7. A remote control blind system according to claim 6, wherein each of said control units has a means for stopping the blind operation which is set by the operation signal of said blind or slats, which transmits a signal to stop the blind operation to said reset signal generating means when there is no said agreement signal, and which is reset by said reset signal generating means.

8. A remote control blind system according to claim 6, wherein said drive means for opening and closing said blind is reset by said reset signal generating means.

* * * * *